(12) United States Patent
Ito et al.

(10) Patent No.: US 10,030,559 B2
(45) Date of Patent: Jul. 24, 2018

(54) OXIDATION CATALYST AND EXHAUST GAS PURIFICATION DEVICE USING SAME

(71) Applicant: N.E. CHEMCAT CORPORATION, Minato-ku (JP)

(72) Inventors: Tomoaki Ito, Shizuoka (JP); Makoto Nagata, Shizuoka (JP)

(73) Assignee: N.E. CHEMCAT CORPORATION, Minato-ku (JP)

( * ) Notice: Subject to any disclaimer, the term of this patent is extended or adjusted under 35 U.S.C. 154(b) by 0 days.

(21) Appl. No.: 14/771,718

(22) PCT Filed: Feb. 28, 2014

(86) PCT No.: PCT/JP2014/055046
§ 371 (c)(1),
(2) Date: Aug. 31, 2015

(87) PCT Pub. No.: WO2014/141903
PCT Pub. Date: Sep. 18, 2014

(65) Prior Publication Data
US 2016/0003118 A1   Jan. 7, 2016

(30) Foreign Application Priority Data

Mar. 15, 2013   (JP) .................................. 2013-052660

(51) Int. Cl.
*F01N 3/10*       (2006.01)
*B01J 37/03*      (2006.01)
(Continued)

(52) U.S. Cl.
CPC ........... *F01N 3/106* (2013.01); *B01D 53/944* (2013.01); *B01J 23/44* (2013.01); *B01J 23/63* (2013.01);
(Continued)

(58) Field of Classification Search
CPC ........ B01D 53/9477; B01D 2255/1021; B01D 2255/2042; B01D 2255/2092; F01D 2255/1023
(Continued)

(56) References Cited

U.S. PATENT DOCUMENTS 4,301,037 A   11/1981   Sanchez et al.
5,627,124 A   5/1997   Farrauto et al.
(Continued)

FOREIGN PATENT DOCUMENTS

EP   1 864 713 A1   12/2007
EP   2 606 971 A1   6/2013
(Continued)

OTHER PUBLICATIONS

Machine Translation of WO 2012147376, Translated on Aug. 5, 2016.*
(Continued)

*Primary Examiner* — Mark Laurenzi
(74) *Attorney, Agent, or Firm* — Oblon, McClelland, Maier & Neustadt, L.L.P.

(57) ABSTRACT

Provided is: an oxidation catalyst having excellent ability to combust diesel fuel intermittently sprayed from a nozzle disposed in an exhaust pipe, the oxidation catalyst being incorporated into an exhaust gas purification device having a diesel particulate filter (DPF) or a catalyst soot filter (CSF) for collecting particulate matter from a diesel engine; and an exhaust gas purification device that uses the oxidation catalyst. An oxidation catalyst for exhaust gas purification in which a precious metal component is carried on an inorganic matrix, wherein the inorganic matrix is one or more inorganic oxides selected from the group consisting of alumina, titania, zirconia, silica, and silica-alumina, the oxidation catalyst being characterized in the use of a material in which
(Continued)

the activation energy of diesel fuel combustion performance is 72 kJ/mol or less.

15 Claims, 5 Drawing Sheets

(51) Int. Cl.
| | |
|---|---|
| *B01J 23/63* | (2006.01) |
| *B01J 35/04* | (2006.01) |
| *B01J 35/10* | (2006.01) |
| *B01J 37/02* | (2006.01) |
| *B01D 53/94* | (2006.01) |
| *B01J 23/44* | (2006.01) |
| *F01N 3/08* | (2006.01) |
| *B01J 35/00* | (2006.01) |

(52) U.S. Cl.
CPC .............. *B01J 35/002* (2013.01); *B01J 35/04* (2013.01); *B01J 35/1019* (2013.01); *B01J 35/1042* (2013.01); *B01J 35/1061* (2013.01); *B01J 37/0201* (2013.01); *B01J 37/0244* (2013.01); *B01J 37/038* (2013.01); *F01N 3/0821* (2013.01); *B01D 2255/1021* (2013.01); *B01D 2255/1023* (2013.01); *B01D 2255/206* (2013.01); *B01D 2255/2092* (2013.01); *B01J 35/0006* (2013.01)

(58) Field of Classification Search
USPC .............. 60/286, 299, 295; 123/563, 568.11; 422/171, 180
See application file for complete search history.

(56) References Cited

U.S. PATENT DOCUMENTS

| | | | |
|---|---|---|---|
| 6,110,862 A | 8/2000 | Chen et al. | |
| 2007/0129245 A1* | 6/2007 | Minami | B01J 23/464 |
| | | | 502/302 |
| 2007/0219082 A1* | 9/2007 | Goto | B01D 53/02 |
| | | | 502/60 |
| 2008/0271441 A1 | 11/2008 | Nagata et al. | |
| 2009/0222191 A1* | 9/2009 | Andrasko | B60T 8/175 |
| | | | 701/102 |
| 2010/0186375 A1 | 7/2010 | Kazi et al. | |
| 2010/0269403 A1* | 10/2010 | Oyler | B01J 23/22 |
| | | | 44/354 |
| 2015/0078966 A1* | 3/2015 | Okajima | B01J 35/1066 |
| | | | 422/172 |

FOREIGN PATENT DOCUMENTS

| | | | |
|---|---|---|---|
| EP | 2 851 528 A1 | 3/2015 | |
| JP | 54-112392 A | 9/1979 | |
| JP | 56-150435 A | 11/1981 | |
| JP | 10-194733 A | 7/1998 | |
| JP | 2002-513672 A | 5/2002 | |
| JP | 2003106140 A * | 4/2003 | |
| JP | 2004-290827 A | 10/2004 | |
| JP | 2004353606 A * | 12/2004 | |
| JP | 2005-262162 A | 9/2005 | |
| JP | 2006-281127 A | 10/2006 | |
| JP | 2007-111625 A | 5/2007 | |
| JP | 2008-272659 A | 11/2008 | |
| JP | 2012-515087 A | 7/2012 | |
| JP | WO 2012147376 A1 * | 11/2012 | .......... B01D 53/944 |
| JP | WO 2013/17218 A1 | 11/2013 | |
| WO | WO 2012/023494 A1 | 2/2012 | |

OTHER PUBLICATIONS

International Search Report dated May 20, 2014 for PCT/JP2014/055046 filed on Feb. 28, 2014.

Extended European Search Report dated Nov. 11, 2016 in Patent Application No. 14764123.7.

\* cited by examiner

OXIDATION CATALYST AND EXHAUST GAS PURIFICATION DEVICE USING SAME

TECHNICAL FIELD

The invention relates to an oxidation catalyst and an exhaust gas purification device using the same, and more particularly, to an oxidation catalyst having an excellent ability to combust diesel fuel intermittently sprayed from a nozzle disposed in an exhaust pipe, the oxidation catalyst being incorporated into an exhaust gas purification device having a diesel particulate filter (DPF) or a catalyst soot filter (CSF) for collecting particulate matter in an exhaust gas from a diesel engine, and an exhaust gas purification device using the same.

BACKGROUND ART

In recent years, the processing of particulate matter (diesel particulates) contained in an exhaust gas from a diesel engine becomes an issue. Most of the particulate matter consist of soot and soluble organic fraction (hereinafter, referred to as 'SOF').

In order to prevent the particulate matter from being emitted to the atmosphere, a configuration of collecting the particulate matter by a diesel particulate filter (hereinafter, referred to as 'DPF') provided in an exhaust passage is effective. However, as the particulate matters are collected, a clogging is caused in the DPF. Thereby, a pressure drop in the system increases, so that an engine trouble is caused. Therefore, in order to solve the clogging, it is necessary to regenerate the DPF by removing the collected particulate matter.

When the particulate matters collected in the DPF are heated to a high temperature (about 600° C.) under the air, the particulate matter are naturally combusted and thus easily removed. However, the temperature increase only by the heat of the exhaust gas is usually insufficient, so that it is very difficult to solve the clogging of the DPF by completely combusting the particulate matter. Regarding this, a variety of methods or means have been suggested in the related art.

For example, it has been suggested that NO contained in the diesel exhaust gas is oxidized to $NO_2$ by an upstream-side oxidation catalyst (Diesel Oxidation Catalyst, hereinafter, referred to as 'DOC') and carbon collected in the downstream-side DPF or catalyzed DPF (Catalyzed Soot Filter, hereinafter referred to as 'CSF') is reacted with $NO_2$ in accordance with a following reaction and is combusted at relatively low temperatures (for example, 225 to 300° C.) (refer to PTLs 1 to 4).

Actually, however, the temperature of the diesel exhaust gas is not sufficiently increased. Therefore, it is not possible to completely combust and remove the collected/deposited particulate matter in the DPF or CSF only by the above means, so that it is necessary to forcibly regenerate the DPF or CSF.

For the forcible regeneration of the DPF or CSF, it is known that the fuel such as diesel fuel is sprayed and supplied into the exhaust gas, which is then combusted by the oxidation catalyst (DOC) and becomes a high-temperature gas, and thereby, the particulate matter deposited in the DPF or CSF is combusted. As the method of spraying and supplying the fuel such as diesel fuel into the exhaust gas, there are a method (exhaust pipe spraying) of disposing a nozzle in an exhaust pipe between an exhaust opening of an engine and the oxidation catalyst and spraying the fuel such as diesel fuel and a method (post spraying) of additionally spraying the fuel into a combustion chamber of an internal combustion engine after a combustion stroke. The respective methods are appropriately used depending on a size of the engine and a structure of an exhaust gas purification device.

However, according to the oxidation catalyst of the related art, when the exhaust gas temperature is low, since the oxidation catalyst is not activated and the diesel fuel is oxidized and combusted, the oxidation catalyst is exhausted, as it is, and the filter is not regenerated. For this reason, a method of providing a heating means such as an electric heater at an upstream side of the oxidation catalyst and increasing the exhaust gas temperature to be supplied to the oxidation catalyst has been suggested (for example, refer to PTLs 5 to 9).

However, according to the above method, since a large amount of power is required in the electric heater for heating a large amount of the exhaust gas and the structure and control of the device are complicated, the method is not favorable in terms of the cost. In particular, it cannot be said that the method is efficient for a diesel engine to be mounted on a vehicle. Thus, it is needed to improve the low-temperature activation of the diesel fuel combustion performance of the oxidation catalyst itself.

Therefore, as a means for sufficiently exhibiting the oxidation and combustion performance of the diesel fuel even at a low exhaust gas temperature area without using the heating means, the applicant suggested the catalyst in which platinum is carried on a $\gamma\text{-}Al_2O_3/La_2O_3$ mixed carrier (refer to PTL 10), and the catalyst in which palladium is carried on the platinum-carried $\gamma\text{-}Al_2O_3/La_2O_3$ mixed carrier and which contains β-type zeolite ion-exchanged with cerium (refer to PTL 11).

In the meantime, regarding the search of the oxidation catalyst, a diesel engine having a large displacement and a large capacity of oxidation catalyst are generally required. The evaluation of the diesel fuel combustion performance by the diesel engine is more difficult than the catalyst performance evaluation using a gasoline engine, in terms of the facility, the cost and the time. Therefore, there is a need for the catalyst with which it is possible to simply determine whether the diesel fuel combustion performance (low-temperature activation) of the oxidation catalyst is good or bad and which can be effectively manufactured.

In general, a matrix consisting of an inorganic oxide and the like on which an active component such as precious metal is carried plays an important role of determining whether the catalyst performance is good or bad. This is because the number of activation points of the active component and the durability performance are highly influenced not only by various properties of a material becoming the matrix such as a surface area (for example, BET specific surface area) of, a pore diameter, a pore volume and the like but also by a type, a number, an amount and the like of an additive having a function of assisting the material. In order to search the catalyst exhibiting the excellent catalyst performance, it is very important to check what of the factors causes a favorable result and has a bad influence with respect to the catalyst performance.

However, since the relations between the good or bad of the catalyst reaction and the factors may be different for each reaction, it cannot be said that it is favorable to uniformly set the factors. Up to now, the catalyst reaction is actually made while changing the conditions for each factor, so that the catalyst performance should be checked each time.

CITATION LIST

Patent Literature

PTL 1: JP-B-3012249
PTL 2: JP-A-2001-263051
PTL 3: JP-A-2002-30924
PTL 4: JP-A-2002-35587
PTL 5: JP-A-8-42325
PTL 6: JP-A-9-222009
PTL 7: JP-A-9-317440
PTL 8: JP-A-10-272324
PTL 9: JP-A-2002-97930
PTL 10: JP-A-2004-290827
PTL 11: JP-A-2006-281127

SUMMARY OF INVENTION

Technical Problem

It is therefore an object of the present invention to provide an oxidation catalyst having an excellent ability to combust diesel fuel intermittently sprayed from a nozzle disposed in an exhaust pipe, the oxidation catalyst being incorporated into an exhaust gas purification device having a diesel particulate filter (DPF) or a catalyst soot filter (CSF) for collecting particulate matter in an exhaust gas from a diesel engine, and an exhaust gas purification device using the same.

Solution to Problem

The inventors have found, after having extensively studied to achieve the above object, that regarding the oxidation catalyst in which precious metal is carried on the inorganic oxide, magnitudes of the generally known property values of the inorganic oxide such as a BET specific surface area, an average pore diameter, a pore volume and the like are not directly related to the diesel fuel combustion performance of the oxidation catalyst and that when an inorganic oxide of which the activation energy of diesel fuel combustion performance is 72 kJ/mol or less is used, it is possible to securely increase the diesel fuel combustion performance by the diesel engine, and achieved the present invention.

Also, the inventors have found that when the inorganic oxide satisfies the above condition and is made as slurry due to a relation of a volume density, if a viscosity abnormality or precipitation abnormality occurs, the diesel fuel combustion performance can be further improved by adding a separate inorganic oxide satisfying the above condition and having a different volume density relieving a property abnormality of the slurry.

That is, according to a first invention of the present invention, there is provided an oxidation catalyst for exhaust gas purification in which a precious metal component is carried on an inorganic matrix, wherein the inorganic matrix is one or more inorganic oxides selected from the group consisting of alumina, titania, zirconia, silica, and silica-alumina, the oxidation catalyst being characterized in the use of a material in which the activation energy of diesel fuel combustion performance is 72 kJ/mol or less.

Also, according to a second invention of the present invention, in the first invention, a mixing ratio of an inorganic oxide of which the activation energy of diesel fuel combustion performance exceeds 72 kJ/mol to the inorganic matrix is 15% by weight or less.

Also, according to a third invention of the present invention, in the first or second invention, the inorganic oxide consists of two or more inorganic oxides having different volume densities.

Also, according to a fourth invention of the present invention, in the first invention, the precious metal component is platinum (Pt) and/or palladium (Pd).

Also, according to a fifth invention of the present invention, in the first invention, the alumina consists of one or more alumina selected from the group consisting of γ-alumina, δ-alumina and θ-alumina.

Also, according to a sixth invention of the present invention, in the first invention, the inorganic oxide further contains a rare earth oxide.

Also, according to a seventh invention of the present invention, in the sixth invention, the rare earth oxide is a lanthanum oxide.

Also, according to an eighth invention of the present invention, in the sixth or seventh invention, an amount of the rare earth oxide contained in the inorganic oxide is 1 to 20% by weight.

Also, according to a ninth invention of the present invention, in the first invention, an amount of the silica contained in the alumina is 1 to 20% by weight.

Also, according to a tenth invention of the present invention, in any one of the first to ninth inventions, the oxidation catalyst is coated on an integral structure-type carrier, as one or more catalyst layers.

Also, according to an eleventh invention of the present invention, in the tenth invention, a coating amount of the catalyst layer is 50 to 300 g/L.

Also, according to a twelfth invention of the present invention, in the tenth or eleventh invention, a total amount of the precious metal to be carried is 0.5 to 4.0 g/L in metal equivalent.

Further, according to a thirteenth invention of the present invention, there is provided an exhaust gas purification device in which the oxidation catalyst according to any one of the first to twelfth inventions is accommodated in an exhaust gas path of a diesel engine together with a diesel particulate filter (DPF) or a catalyst soot filter (CSF) including the precious metal component and is disposed upstream of the combustion filter (DPF or CSF).

In the meantime, according to a fourteenth invention of the present invention, there is provided an exhaust gas purification method of using the exhaust gas purification device according to the thirteenth invention, and intermittently spraying diesel fuel from a nozzle disposed in an exhaust pipe disposed upstream of the combustion filter (DPF or CSF) or additionally spraying the diesel fuel into a combustion chamber of an internal combustion engine after a combustion stroke to combust and remove diesel particulate matter.

Advantageous Effects of Invention

The oxidation catalyst of the present invention has the excellent ability to combust the diesel fuel intermittently sprayed from the nozzle so as to increase the exhaust gas temperature when treating the particulate matter such as HC, CO, NOx, soot and the like in the exhaust gas emitted from the diesel engine.

Further, according to the present invention, it is possible to easily determine whether the diesel fuel combustibility as the oxidation catalyst is good or bad, based on the good or bad of the activation energy necessary for the combustion performance of the inorganic matrix itself. Therefore, it is not necessary to manufacture a large capacity of catalyst and to perform the evaluation with a diesel engine having a large displacement, so that it is possible to realize the low facility/low cost and to remarkably save the time necessary for the catalyst searching.

DESCRIPTION OF EMBODIMENTS

Hereinafter, the oxidation catalyst and exhaust gas purification device of the present invention will be described in detail when they are applied to a diesel vehicle. However, the present invention can also be effective for a diesel engine that is used for a variety of stationary power sources such as a power generator.

1. [DOC: Oxidation Catalyst]

The oxidation catalyst (DOC) of the present invention is an oxidation catalyst in which a precious metal component for oxidizing NO, HC and CO in the exhaust gas and unburned fuel such as diesel fuel is carried on a specific inorganic matrix. As the precious metal component, at least a platinum component having excellent oxidation activity is contained, and as the inorganic matrix, an inorganic oxide selected from the group consisting of alumina, titania, zirconia, silica and silica-alumina and having the activation energy of diesel fuel combustion performance of 72 kJ/mol or less is used.

In the meantime, in a diesel engine exhaust gas purification system, it is most important to remove particulate matter such as soot in the exhaust gas emitted from a diesel engine. Also, in order for a diesel particulate filter (DPF) or catalyst soot filter (CSF) including the precious metal component to stably repeat the collecting and combustion removal of the particulate matter such as soot over a long period of time, it is more important for the oxidation catalyst disposed at a front stage of the filter to exhibit the excellent diesel fuel combustion performance than the oxidation of NO, CO, HC and the like.

(Precious Metal Component)

As described above, in the oxidation catalyst, the platinum component is generally used as the precious metal component. In some cases, a palladium component may be used. However, it is difficult to obtain the sufficient NO oxidation activity only with the Pd component. Also, the Pd component is likely to be poisoned by a sulfur component in the heavy or diesel fuel, which is the fuel of the diesel engine, so that it may be deactivated due to the prolonged use.

Although Pd has the above demerits, it is more inexpensive than Pt and may exhibit the higher oxidation activity than Pt, depending on HC species and atmosphere of the exhaust gas. Therefore, it is possible to find out an optimal condition in terms of performance and cost by appropriately distributing a carrying ratio of Pt and Pd.

In the present invention, considering the above situations, a ratio of Pt and Pd is preferably 1:1 to 11:2, and more preferably 3:2 to 11:2. When the ratio is smaller than 1:1, a content rate of platinum is reduced, so that the oxidation activity of HC, CO, NO and the like and the heat generation ability of the exhaust gas by the combustion of the unburned diesel fuel and the like are highly lowered. When the ratio is greater than 11:2, the content rate of platinum is increased, so that there is no merit in terms of the cost.

(Promoter Component)

According to the present invention, the oxidation catalyst may obtain the sufficient low-temperature activity in terms of the diesel fuel combustion performance. In addition to this, the oxidation catalyst is required to have an oxidation function of oxidizing and removing CO and HC in the exhaust gas and oxidizing NO to $NO_2$ at the low temperatures.

The catalyst of the present invention is excellent in the low-temperature oxidation reaction of CO, HC, NO and the like. In order to further promote the corresponding function, ceria, ceria-zirconia, various zeolites, neodymium, a rare earth oxide such as a lanthanum oxide, zirconia and the like may be used as a promoter component.

The ceria, ceria-zirconia and the like are supplied with oxygen to contribute to promotion of the low-temperature oxidation reaction of CO, HC, NO and the like by platinum, palladium and the like. The various zeolites absorb HC at low temperatures and emit the same at high temperatures, thereby supporting the oxidation reaction by platinum and palladium to contribute to the purification reaction of HC at low temperatures. Also, it is thought that the neodymium, rare earth oxide such as lanthanum oxide, and zirconia are particulate matter and are carried around platinum and palladium to suppress platinum and palladium from being moved and agglomerated on the matrix due to the heat.

Content rates of the promoters are respectively different depending on functions. The content rates of the ceria, ceria-zirconia and the like are preferably 70% by weight or less of a weight of the inorganic oxide forming the matrix on which the precious metal is carried, and more preferably 50% by weight or less. Also, the content rates of the various zeolites are 100% by weight or less of the weight of the inorganic oxide, and more preferably 70% by weight or less. In addition, the content rates of the neodymium, rare earth oxide such as lanthanum oxide, and zirconia are preferably 500% by weight or less of the content rate of the precious metal such as platinum and the like, and more preferably 300% by weight or less.

Regarding the promoters, when the content rates of the ceria and the like are excessively high, the heat resistance of the catalyst is lowered, when the content rates of the various zeolites are excessively high, a pressure drop is increased as an opening rate in cells is decreased, and when the content rates of the rare earth oxide and the like are excessively high, the pores of the matrix are blocked, so that the activity is lowered and the performance of the oxidation catalyst is thus lowered.

(Inorganic Matrix)

The precious metal component and the promoter component are carried on the inorganic oxide (inorganic matrix), are mixed with other catalyst components, as required, and are coated on an integral structure-type carrier, as a catalyst composition. As the inorganic oxide serving as the inorganic matrix carrying thereon the precious metal component, a catalyst material well known in the field of the exhaust gas purification catalyst can be used. As the inorganic oxide, a porous inorganic oxide having high heat resistance and capable of stably dispersing the precious metal component due to the large BET specific surface area value thereof is preferably used.

In the present invention, the activation energy of the diesel fuel combustion performance of the inorganic oxide itself is 72 kJ/mol or less.

The activation energy of the diesel fuel combustion performance of the inorganic oxide itself is calculated from a Kissinger plot described in the below.

When a plurality of DTA measurements is performed while changing a rate of temperature increase in a thermal analysis, a following equation is satisfied, in that change rates of DTA curves are the same.

$$\ln\left(\frac{\phi_1}{T_1^2}\right) + \frac{Ea}{RT_1} = \ln\left(\frac{\phi_2}{T_2^2}\right) + \frac{Ea}{RT_2} = \Lambda \qquad \text{[Equation 1]}$$

(In the equation, $\phi$: rate of temperature increase [K/min], T: absolute temperature [K], Ea: activation energy (per one mole), R: gas constant)

The activation energy (Ea) is calculated from a gradient ($-Ea/R$) obtained from a plot in which $\ln(\phi/T^2)$ at a point (T) at which the change rate of the DTA curve is greatest is a vertical axis and $1/T$ is a horizontal axis. The plot at the point at which the change rate is greatest is referred to as a Kissinger plot.

Figure 1:
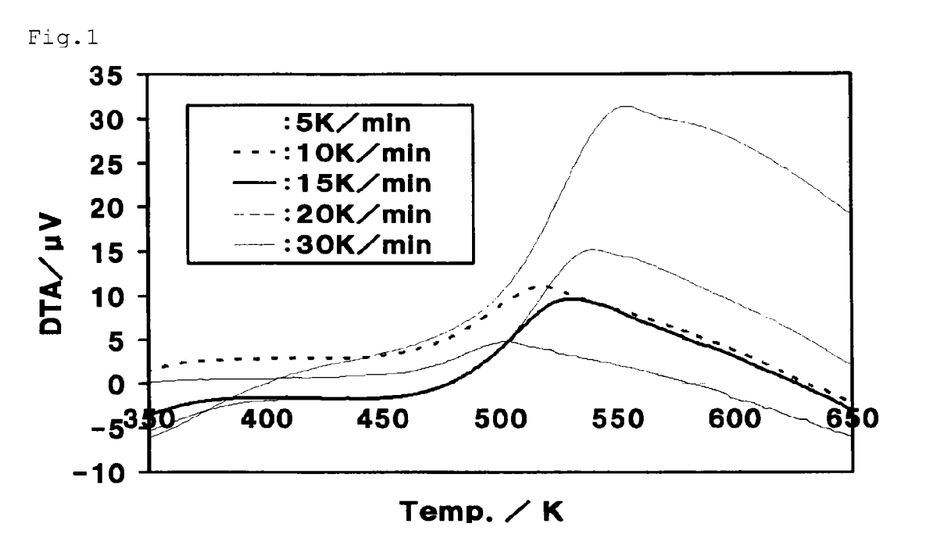
FIG. 1 illustrates changes of raised temperature and DTA in a simple diesel fuel combustibility test when alumina powder A is used as a material of the oxidation catalyst (DOC) of the present invention.
Figure 2:
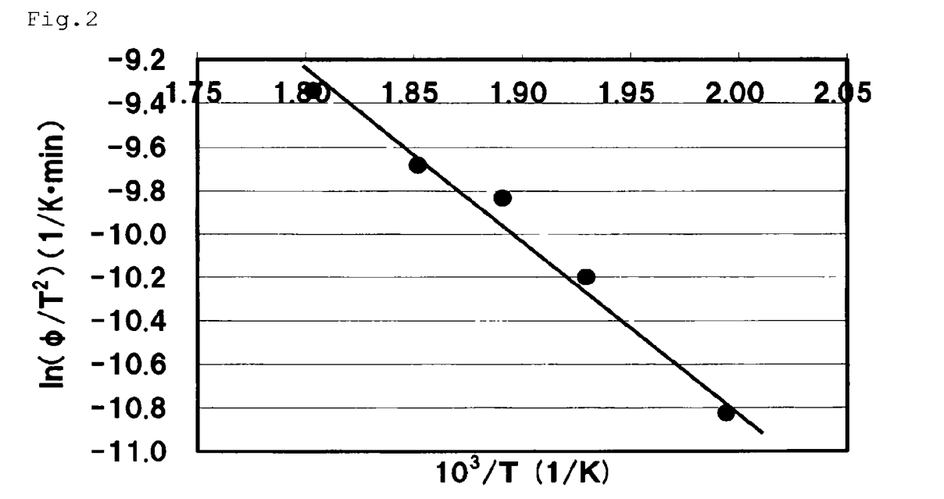
FIG. 2 illustrates a Kissinger plot for calculating the activation energy of the diesel fuel combustibility of the alumina powder A, based on data obtained from FIG. 1.

Specifically, for example, the diesel fuel is added to the inorganic oxide (sample) such as alumina powder and the DTA measurement is performed while changing the rate of temperature increase ($\phi$) (5 to 30 K/min) by a TG-DTA measurement device (refer to FIG. 1). Then, $\ln(\phi/T^2)$ and $1/T$ at a peak (a point T at which the change rate is greatest) of the obtained temperature rise curve are plotted (Kissinger plot) (refer to FIG. 2) and the activation energy (Ea) is obtained from a gradient thereof. The same processing is performed for the other samples, so that the activation energies (Ea) are obtained. The results are compared later.

The activation energy of the diesel fuel combustion performance of the inorganic oxide itself should be 72 kJ/mol or less, more preferably 71 kJ/mol or less, and particularly preferably 70 kJ/mol or less. When activation energy of the diesel fuel combustion performance of the inorganic oxide exceeds 72 kJ/mol, the low-temperature diesel fuel combustion performance of the oxidation catalyst in which the precious metal is carried on the inorganic oxide configured as the matrix is lowered, as described later.

As the inorganic oxide, alumina, titania, zirconia, silica, silica-alumina and the like may be exemplified. One may be individually used or two or more inorganic oxides may be combined.

As an example, alumina is described as the inorganic oxide (inorganic matrix) for carrying thereon the precious metal and promoter. However, the other inorganic oxides are also the same.

For example, as the alumina, γ-alumina, δ-alumina, θ-alumina and the like having a large BET specific surface area value may be enumerated.

In the meantime, there is no clear correlativity between the enumerated types (γ-, δ- or θ-) of the alumina and the diesel fuel combustion performance. Likewise, as described later, there is no clear correlativity between the properties (BET specific surface area, average pore diameter, pore volume) of the alumina and the diesel fuel combustion performance. A key of the present invention is that only a magnitude of the activation energy of the diesel fuel combustion performance of the inorganic oxide itself can be used to determine the good or bad of the low-temperature diesel fuel combustion performance of the oxidation catalyst in which the precious metal is carried on the inorganic oxide configured as the matrix.

Also, in order to increase the heat resistance, the rare earth oxide such as lanthanum, the silica, the zirconia and the like are preferably added to the alumina. In particular, it has been known that the alumina having lanthanum added thereto has the excellent heat resistance, and when the precious metal component such as platinum component and palladium component is carried thereon, the high catalyst activity is maintained even at high temperatures (refer to JP-A-2004-290827). Therefore, the rare earth oxide such as lanthanum, the silica, the zirconia and the like, which increase the durability of the alumina, are preferably added to the alumina so that upon the combustion of the sprayed diesel fuel, even when the diesel fuel is non-uniformly sprayed due to abnormality of a sprayer, for example, and a part of the oxidation catalyst is exposed to abnormal high temperatures, a crystalline structure of the alumina is maintained.

In the meantime, the content rates of the rare earth oxide such as lanthanum, the silica, the zirconia and the like in the alumina are preferably 1 to 20% by weight, more preferably 2 to 15% by weight. When the content rates of the rare earth oxide such as lanthanum, the silica, the zirconia and the like are less than 1% by weight, the influence of the additives on the durability performance of the alumina is too low. On the other hand, when the content rates exceed 20% by weight, the additives may have a bad influence on the properties (BET specific surface area, pore diameter, pore volume and the like) of the alumina, or an interaction between the additives and the precious metal becomes too strong, so that the low-temperature combustion performance of the diesel fuel may be badly influenced.

Briefly describing the other inorganic oxides, the titania includes an anatase type, a rutile type, a brookite type and the like. However, the anatase type titania is preferably used because it has a large BET specific surface area capable of highly dispersing the precious metal. When the anatase type titania is heated to 900° C. or higher, it transitions to the rutile type titania, and when the brookite type titania is heated to 650° C. or higher, it transitions to the rutile type titania. When the titania once transitions to the rutile type, the titania does not return to the original anatase type or brookite type. Considering that the using condition of the catalyst is 800° C. or lower, it is not preferably to use the rutile type titania having a small BET specific surface area and the brookite type titania that may thermally phase-transition.

The zirconia has a crystalline structure of monoclinic system at room temperatures. When the temperature increases, the zirconia phase-transitions to a tetragonal crystal system and a cubic crystal system. The phase transition causes a volume change, so that a sintered body of zirconia may be fractured when the temperature is repeatedly increased and decreased. For this reason, when a calcium oxide, a magnesium oxide or a rare earth oxide such as a yttrium oxide and the like is dissolved as a solid solution in the zirconia, oxygen vacancies are formed in the structure and the cubic crystal system and tetragonal crystal system are stabilized even at the room temperatures, so that the fracture due to the repeated increase and decrease of the temperature is suppressed. The oxide is also referred to as a stabilized zirconia or partially stabilized zirconia and is preferably used in the present invention.

Also, the silica is distinguished into an amorphous type, a glass type and a colloid type, in addition to a variety of crystalline silica different phase transformations, is generally known to have a larger BET specific surface area than the alumina and can be expected to highly disperse the precious metal.

Further, the silica-alumina is classified into a crystalline type and a non-crystalline type and Si/Al ratios are also diverse. It is possible to select the silica-alumina having an appropriate Si/Al ratio, in conformity to the uses. A variety of types of the crystalline zeolite are known depending on the pore structure. However, ZSM, β-type and the like are used for the NOx removal catalyst.

In the meantime, although the inorganic oxides may be individually used, second and third components are preferably added so as to increase the heat resistance, like the alumina. In the NOx removal catalyst, the titania of which a surface is coated with the silica may be used, for example.

The inorganic oxides and the inorganic oxide compounds thereof are not particularly limited in terms of compositions, structures and manufacturing methods. For example, a starting material having a form of nitrate, sulfate, carbonate, acetate, chloride and the like including the elements is dissolved and mixed in an aqueous solution, which is then precipitated as precipitates by pH adjustment and the like or evaporated to dryness. Then, the resultant solid material may be calcined. When mixing or compounding, the plurality of metal salts may be solubilized at one time and then the above processing may be performed. Alternatively, the processing may be performed for the single or multiple metal salts to form the oxides and then the remaining metal salts may be carried at one time or sequentially.

In the present invention, it is important that the activation energy of the diesel fuel combustion performance of the inorganic oxide itself is 72 kJ/mol or less. When the precious metal component and the promoter can be sufficiently dispersed, the inorganic oxide is not particularly limited by the BET specific surface area, the pore diameter, the pore volume and the like.

In the oxidation catalyst of the present invention, the low-temperature activity of the diesel fuel combustion performance is most important and the oxidation performance of NO, CO, HC and the like is also preferably excellent.

Therefore, the BET specific surface area, pore diameter and pore volume of the inorganic oxide are also preferably within ranges in which the precious metal component and the promoter can be sufficiently dispersed.

In one example, the alumina is described below. However, the other inorganic oxides are also the same. As for the alumina, the BET specific surface area value (obtained by a BET method; the same shall apply hereinafter) is preferably 50 to 300 $m^2/g$, and more preferably 80 to 250 $m^2/g$. When the BET specific surface area value of the alumina is greater than 300 $m^2/g$, the pore diameter is relatively reduced, so that the gas diffusion may be deteriorated or the pores may be blocked. On the other hand, when the BET specific surface area value is smaller than 50 $m^2/g$, the dispersibility of the precious metal and promoter may be deteriorated.

Also, the pore diameter (diameter value by a BJH method; the same shall apply hereinafter) is preferably 10 to 60 nm, more preferably 12 to 50 nm, and most preferably 15 to 40 nm. When the pore diameter of the alumina is smaller than 10 nm, the gas diffusion in the pores becomes slow and the pores may be blocked due to the soot. On the other hand, when the pore diameter is greater than 60 nm, the BET specific surface area is relatively reduced, so that the dispersibility of the precious metal and promoter is deteriorated.

Also, the pore volume of the alumina is preferably 0.3 to 2.0 $cm^3/g$, and more preferably 0.5 to 1.5 $cm^3/g$. When the pore volume of the alumina is greater than 2.0 $cm^3/g$, the pore diameter is relatively reduced, so that the gas diffusion may be deteriorated or the pores may be blocked. On the other hand, when the pore volume of the alumina is smaller than 0.3 $cm^3/g$, the dispersibility of the precious metal and promoter may be deteriorated.

In the present invention, one or more inorganic oxides of which the activation energy (Ea) of the diesel fuel combustion performance is 72 kJ/mol or less are selected and used. When two or more inorganic oxides are mixed and used, it is preferable that the activation energies (Ea) of all the inorganic oxides should be 72 kJ/mol or less.

(Carrying of Precious Metal on Inorganic Matrix)

In order to carry platinum and palladium, which are the precious metals, on the inorganic matrix, as a starting salt of platinum, an ethanolamine solution of hexahydroxoplatinic (IV) acid, tetraammineplatinum(II) acetate, tetraammineplatinum(II) carbonate, tetraammineplatinum(II) nitrate, a nitric acid solution of hexahydroxoplatinic (IV) acid, platinum nitrate, diamminedinitroplatinum nitrate, hexachloroplatinic(IV) acid and the like can be used.

Also, as a starting salt of palladium, tetraamminepalladium(II) acetate, tetraamminepalladium(II) carbonate, tetraamminepalladium(II) nitrate, diamminedinitropalladium, palladium nitrate, palladium chloride and the like can be used. The preferable one as the starting salt of platinum is the ethanolamine solution of hexahydroxoplatinic(IV) acid, platinum nitrate, diamminedinitroplatinum nitrate, tetraammineplatinum (II) nitrate, or the like, and the one in which components other than the precious metal easily volatilize by heat treatment upon catalyst preparation is preferable.

In the meantime, when a chloride is used as the starting salt, the catalyst activity may be badly influenced due to remaining of chlorine, depending on a manufacturing method.

After mixing an aqueous solution of the metal salt and the inorganic matrix, the mixture can be appropriately dried and calcined by a known method.

The starting salts may be individually carried, respectively. However, in the present invention, in order to expect the synergetic effect of platinum and palladium and to bring platinum and palladium close to each other, it is preferably to match property (acidity, alkalinity) of aqueous solution of each starting salt of platinum and palladium. For example, combinations of tetraammineplatinum (II) acetate-tetraamminepalladium(II) acetate (both are alkaline); an ethanolamine solution of hexahydroxoplatinic(IV) acid-tetraamminepalladium(II) acetate (the same as above); platinum nitrate-palladium nitrate (both are acidic); diamminedinitroplatinum nitrate-palladium nitrate (the same as above); hexachloroplatinic (IV) acid-palladium chloride (the same as above) and the like may be enumerated.

By making the properties of the aqueous solutions of the starting salts of platinum and palladium the same, even when both aqueous solutions are mixed, a uniform solution state can be maintained as it is, without generation of a precipitate. Therefore, the platinum particle and the palladium particle are present each in a mixed state and can be easily close to each other, even after they are carried on the inorganic matrix.

2. [Carrier Having an Integral-Type Structure]

In the oxidation catalyst (DOC) of the present invention, in order to carry the precious metal component and promoter component in a good dispersion state, a carrier having an integral-type structure, that is, a honeycomb structure (hereafter may also be referred to as a honeycomb carrier) is used. The honeycomb structure is a honeycomb-shaped structure in which many through-holes are concentrated. As a material of the honeycomb structure, stainless steel, silica, alumina, silicon carbide, cordierite and the like may be used. In the present invention, the honeycomb structure made of any of these materials can be used.

An overall shape of the honeycomb carrier may be selected as appropriate from a column-type, a square pole-type, a hexagonal cylinder-type and the like, depending on a structure of an exhaust system to be applied. Further, as for a pore number of the opening part, an appropriate pore number is determined in consideration of a kind of the exhaust gas to be treated, a gas flow rate, a pressure drop, removal efficiency and the like. Usually, about 50 to 900 pores per one inch$^2$ (6.45 cm$^2$) is preferable, and 100 to 600 pores are more preferable for application of exhaust gas purification of a diesel vehicle. A cell density of 50 pores or more per one inch$^2$ (6.45 cm$^2$) can obtain a contact area between the exhaust gas and the catalyst and provide a sufficient exhaust gas purification function. The cell density of 900 pores or less per one inch$^2$ (6.45 cm$^2$) does not lead to a significant pressure drop of the exhaust gas and does not deteriorate performance of an internal combustion engine.

In addition, a thickness of a cell wall of the honeycomb carrier is preferably 2 to 15 mil (milli inch) (0.05 to 0.4 mm), and more preferably 3 to 12 mil (0.076 to 0.3 mm).

In the oxidation catalyst (DOC) of the present invention, a carrying amount of the precious metal component is preferably 0.5 to 4.0 g/L, and more preferably 0.8 to 3.0 g/L, in metal equivalent, per a unit volume of the integral structure-type carrier. When the amount of the precious metal component is too small, it is not possible to sufficiently obtain the HC and CO oxidation removal performance, the NO oxidation performance, the combustibility of the unburned fuel such as diesel fuel. On the other hand, when the amount of the precious metal component is too large, the merits in terms of the cost may not be obtained.

Further, in the oxidation catalyst (DOC) of the present invention, a coating amount of a catalyst layer is preferably 50 to 300 g/L, and more preferably 70 to 250 g/L. When the coating amount of the catalyst layer is below 50 g/L, the dispersibility of the precious metal such as platinum to be carried is deteriorated to decrease the oxidation activity. On the other hand, when the coating amount of the catalyst layer exceeds 300 g/L, an inside of the cell is narrowed to increase the pressure drop.

(Catalyst Preparation Method)

In the present invention, in order to prepare the oxidation catalyst (DOC) by using the honeycomb carrier and the catalyst material, a washcoat method is generally used.

First, the catalyst material including the inorganic oxide having the specific activation energy (Ea) and the honeycomb carrier are provided. The catalyst material is prepared by mixing an additive such as a binder or a surfactant, as needed, with water or a solvent, in which a water-soluble organic solvent is added to water, to make a slurry-like mixture, applying the mixture onto the honeycomb carrier and then drying and calcining the same. That is, the catalyst material is mixed with water or a solvent, in which a water-soluble organic solvent (aqueous medium) is added to water, in a predetermined ratio, so that the slurry-like mixture is obtained. In the present invention, the aqueous medium is preferably used in an amount with which each catalyst component can be uniformly dispersed in the slurry.

The catalyst material includes the precious metal component including at least platinum, as the inorganic matrix. The precious metal component may be carried in advance on the inorganic matrix. The metal catalyst component and the inorganic matrix are mixed in the aqueous medium to prepare the slurry.

When preparing the catalyst material, in a case where the precious metal is carried in advance on the inorganic matrix, a known method may be appropriately adopted. An example thereof is described as follows.

First, as a raw material of the precious metal component, a compound such as nitrate, carbonate, acetate and chloride, specifically, an ethanolamine solution of hexahydroxoplatinic (IV) acid, tetraammineplatinum(II) acetate, tetraammineplatinum (II) carbonate, tetraammineplatinum (II) nitrate, a nitric acid solution of hexahydroxoplatinic (IV) acid, platinum nitrate, diamminedinitroplatinum nitrate, hexachloroplatinic (IV) acid and the like are prepared, and as a starting salt of palladium, tetraamminepalladium(II) acetate, tetraamminepalladium(II) carbonate, tetraamminepalladium(II) nitrate, diamminedinitropalladium, palladium nitrate, palladium chloride and the like are prepared. By selecting any one from them and dissolving it in an organic solvent, a solution of the precious metal component raw material is prepared.

Then, the solution of the precious metal component raw material is mixed with the inorganic matrix, together with the aqueous medium, which is then is dried at 50 to 200° C. to remove the solvent and is then calcined at 300 to 1200° C. In the meantime, a known catalyst material may be blended, as a binder and the like, in addition to the above components. As the known catalyst material, alumina, silica, titania, zirconia, silica-alumina, ceria, an alkali metal material, an alkaline earth metal material, a transition metal material, a rare earth metal material and the like may be exemplified. Also, a dispersing agent and a pH adjuster may be used in combination, as required.

When making the catalyst material into the slurry-like mixture, it is important to maintain the slurry at the appropriate properties. As for the properties of the slurry, a viscosity is preferably 100 to 10,000 mPa·s. When the viscosity of the slurry is smaller than 100 mPa·s, the catalyst material precipitates fast in the slurry and it is difficult to apply a predetermined amount of the slurry to the honeycomb carrier one time, so that the application should be performed several times, which causes a problem in terms of the cost. On the other hand, when the viscosity of the slurry exceeds 10,000 mPa·s, the cells of the honeycomb carrier are blocked by the slurry, so that the clogging is caused. Also, after the slurry is applied, the catalyst material is likely to peel off from the honeycomb carrier. The preferable viscosity is 500 to 2,000 mPa·s.

As the factors influencing the properties of the slurry, a volume density of the inorganic oxide may be exemplified. When the volume density is too high or too low, the properties of the slurry are deteriorated. Further, in the oxidation catalyst after the slurry is applied, the various problems such as clogging, peeling off, inclination of the catalyst layer in the cell, increase in the number of coating times, and the like may be caused.

For this reason, it is also very important to set the volume density of the inorganic oxide to an appropriate specification. For example, the alumina is described. However, the other inorganic oxides are also the same.

As for the alumina, the volume density is preferably 0.25 to 0.40 g/cm$^3$. When the volume density is greater than 0.40 g/cm$^3$, the precipitation in the slurry occurs fast, so that the alumina is separated from water. On the other hand, when the volume density is less than 0.25 g/cm$^3$, the water absorbability is high, so that a ratio of the solid content should be considerably reduced so as to make the normal slurry. Thereby, it is difficult to apply a predetermined amount of the slurry to the honeycomb carrier one time, so that the application should be performed several times, which causes a problem in terms of the cost.

For this reason, when the inorganic oxide of which the activation energy of the diesel fuel combustion performance is 72 kJ/mol or less, which is found out by the present invention, has the volume density within the above-described range, there is no problem even when the slurry is made. However, when the volume density deviates from the above-described range, it is preferably to take following measures.

Specifically, when the volume density of the inorganic oxide exceeds the upper limit, an inorganic oxide having a low volume density is mixed, and when the volume density of the inorganic oxide is less than the lower limit, an inorganic oxide having a high volume density is mixed. Thereby, the volume density after the mixing is made to be appropriate, so that it is possible to appropriately make the properties of the slurry. In this case, it is preferable that both the inorganic oxides having different volume densities have the activation energy of the diesel fuel combustion performance of 72 kJ/mol or less. However, upon the selection of the inorganic oxide having a different volume density, when an inorganic oxide of which the activation energy of the diesel fuel combustion performance is higher than 72 kJ/mol is inevitably used, a mixing ratio thereof is preferably 15% by weight or less, more preferably 10% by weight or less, and particularly preferably 5% by weight or less.

Subsequently, the catalyst composition is applied and coated to the honeycomb carrier, as the slurry-like mixture. After coating the catalyst composition, drying and calcining are performed. A drying temperature is preferably 100 to 300° C., and more preferably 100 to 200° C. In addition, a calcining temperature is preferably 300 to 600° C., and particularly preferably 400 to 600° C. A drying time period is preferably 0.5 to 2 hours and a calcining time period is preferably 1 to 3 hours. The heating may be performed using a known heating means such as an electric furnace, or a gas furnace.

(Layer Configuration)

The catalyst composition may be coated on the honeycomb carrier, as one layer or two or more layers.

A coating amount of the catalyst layer is preferably 50 to 300 g/L. Also, a total carrying amount of the precious metal is preferably 0.5 to 4.0 g/L in metal equivalent.

In the configuration where the two upper and lower layers are formed, the carrying ratio of the precious metal is changed in the upper and lower layers. In the upper layer, the carrying amount is preferably 50% by weight or more of the total amount of the precious metal, and more preferably 60% by weight or more. Also, as for the coating amount of the catalyst layer, the coating ratio is changed in the upper and lower layers. In the upper layer, the coating amount is preferably less than 50% by weight of the total coating amount, and more preferably less than 40% by weight. In this way, the particulate matter of the sprayed diesel fuel can easily contact the precious metal, so that the combustion reaction is likely to occur.

Further, in the configuration where the two upper and lower layers are formed, the upper layer may be coated only at an upstream side of the exhaust gas. In this case, a range of the upper layer to be coated is preferably 75% or less of the upstream side of the honeycomb carrier, more preferably 50% or less, and most preferably 25% or less. In this way, the particulate matter of the sprayed diesel fuel can easily contact the precious metal, so that the combustion reaction is likely to occur.

In addition, after applying the catalyst composition onto the honeycomb carrier, as one layer or two or more layers, only the precious metal may be carried on the upstream-side of the exhaust gas. In this case, a range to carry the precious metal is preferably 75% or less of the upstream side of the honeycomb carrier, more preferably 50% or less, and most preferably 25% or less. In this range, the particulate matter of the sprayed diesel fuel can easily contact the precious metal, so that the combustion reaction is likely to occur.

As described above, the configuration of the various layers is considered as the oxidation catalyst. However, it is determined whether the layer is configured as one layer or two upper and lower layers, whether the two upper and lower layers are configured as the two simple layers, whether the range of the upper layer to be coated is inclined at the upstream side and whether the carrying area of the precious metal is inclined at the upstream side, in consideration of the various factors such as a regulated value of the exhaust gas in a corresponding region, a type and a quality of the fuel to be used such as diesel fuel, an engine displacement of the diesel engine, a disposal position of the oxidation catalyst, cost permitted for an exhaust gas purification system, and the like.

3. [Exhaust Gas Purification Device]

In an exhaust gas purification device of the present invention, the oxidation catalyst (DOC) is accommodated in an exhaust gas path of a diesel engine together with the diesel particulate filter (DPF) or the catalyst soot filter (CSF) including the precious metal component and is disposed upstream of the combustion filter (DPF or CSF).

The diesel particulate filter (DPF) is configured to collect particulate matter (diesel particulate) such as soot in the exhaust gas emitted from the diesel engine, and the catalyst soot filter (CSF) is a combustion filter in which the precious metal component is carried and catalyzed on the DPF. Also, a nozzle configured to intermittently spray the diesel fuel may be disposed in an exhaust pipe in front of the DPF or CSF.

4. [Exhaust Gas Purification Method]

An exhaust gas purification method of the present invention is a method of intermittently spraying the diesel fuel from the nozzle disposed in the exhaust pipe in front of the oxidation catalyst or additionally spraying the diesel fuel into a combustion chamber of the internal combustion engine after a combustion stroke, by using the above device.

By the diesel fuel spraying, the diesel fuel is combusted on the oxidation catalyst, so that the high-temperature exhaust gas is generated and at least a part of the particulate matter deposited on the combustion filter (DPF or CSF) is forcibly combusted and removed by the high-temperature exhaust gas.

EXAMPLES

In the below, Examples and Comparative Examples are described to further clarify the features of the present invention. However, it should be noted that the present invention is not limited to aspects of the examples.

In the meantime, as for the alumina used for the oxidation catalyst (DOC) in the Examples and the Comparative Examples, the activation energy of the diesel fuel combustion performance, the BET specific surface area, the pore diameter, the pore volume and the volume density were measured by methods described below, respectively.

<Activation Energy of Diesel fuel Combustion Performance>

The various alumina powders of 10 g were respectively weighted, which were then calcined at 700° C. for 20 hours in the electric furnace. After the cooling, the alumina powder was taken out from the electric furnace and 10 mg was separated therefrom, and 1 mg of the commercially available diesel fuel was added to the heat-treated alumina powders. After that, the powder was filled in a sample pipe of the TG-DTA measurement device, and the DTA measurement was performed using Thermo Plus TG-8120 (Rigaku Corporation) while changing the rate of temperature increase (φ) to 5, 10, 15, 20 and 30 K/min. Based on DTA curve, the activation energy was calculated from the slope of the plot (Kissinger plot) in which $\ln(\phi/T^2)$ at a point (T) at which the change rate of the DTA curve was greatest is a vertical axis and 1/T is a horizontal axis.

<BET Specific Surface Area>

The BET specific surface areas of the various alumina powders were measured by a BET method in which $N_2$ was used as adsorption molecules by TriStar 3000 (Micromeritics).

<Pore Distribution (Pore Diameter, Pore Volume) Measurement>

The pore diameters (mode diameters) and pore volumes of the various alumina powders were measured by a BJH method in which $N_2$ was used as adsorption molecules by TriStar 3000 (Micromeritics).

<Volume Density>

The volume densities of the various alumina powders were measured in accordance with APPIE (Association of Powder Process Industry and Engineering, Japan) Standard SAP 01-79.

<Viscosity>

The viscosities of the various slurries were measured by a B-type viscometer (Model BII DIGITAL VISCOMETER) (TOKIMEC).

<Engine Evaluation Test of Catalyst>

After the diesel fuel combustibility oxidation catalyst was stored in a converter, the converter was mounted to an exhaust opening of the diesel engine, and the diesel fuel spraying test was implemented to perform the engine evaluation of the catalyst in accordance with following procedures.

In the diesel fuel combustibility oxidation catalysts in Examples 1 to 4 and Comparative Examples 1 and 2, the heat treatment was performed at 650° C. for 50 hours (for a diesel engine having a displacement of 2 L) by the electric furnace. The heat treatment was performed at 600° C. for 50 hours (for a diesel engine having a displacement of 5 L) by the electric furnace in Examples 2 and 4, and the heat treatment was performed at 650° C. for 50 hours (for a diesel engine having a displacement of 3 L) by the electric furnace in Example 5 and Comparative Example 3.

1. Diesel Fuel Combustibility Test 1-1. Diesel Fuel Spraying Test in Diesel Engine Having Displacement of 2 L The rotation number of the diesel engine was set to 2,000 rpm, the exhaust gas temperature was fixed to 220° C. with a thermocouple disposed in front of a catalyst entry, the commercially available diesel fuel was ON/OFF sprayed in an amount of 10 mL/minute at an interval of 3 minutes from a spray pipe disposed in front of the catalyst entry, and the temperature of the exhaust gas was measured with a thermocouple disposed at the rear of a catalyst exit. A difference between the highest reaching temperature of the exhaust gas at the catalyst exit during the diesel fuel spraying and the lowest reaching temperature of the exhaust gas at the catalyst exit during the stop of the diesel fuel spraying was set as a rise amount of the exhaust gas temperature (refer to below $\Delta T$ (° C.)). The greater $\Delta T$ indicates that the combustion performance is excellent because it means that the diesel fuel is more combusted to generate the heat.

$\Delta T$ (° C.)=(the highest reaching temperature of the exhaust gas at the catalyst exit during the diesel fuel spraying)–(the lowest reaching temperature of the exhaust gas at the catalyst exit during the stop of the diesel fuel spraying)

1-2. Diesel Fuel Spraying Test in Diesel Engine Having Displacement of 5 L

The same test as the diesel fuel spraying test in the diesel engine having a displacement of 2 L was performed except that the rotation number of the diesel engine was set to 2,000 rpm and the exhaust gas temperature was fixed to 200° C. with the thermocouple disposed in front of the catalyst entry.

1-3. Diesel Fuel Spraying Test in Diesel Engine Having Displacement of 3 L

The same test as the diesel fuel spraying test in the diesel engine having a displacement of 2 L was performed except that the rotation number of the diesel engine was set to 1,500 rpm, the exhaust gas temperature was fixed to 210° C. with the thermocouple disposed in front of the catalyst entry and the diesel fuel was sprayed in an amount of 20 mL/minute.

Example 1

<Preparation of Oxidation Catalyst (1) for Diesel Fuel Combustion>

=Lower Layer=

An aqueous solution of platinum nitrate and an aqueous solution of palladium nitrate were mixed as raw materials of the precious metal component so that a ratio of platinum and palladium was 3:1 in a weight ratio. Thereby, a Pt—Pd mixed solution was obtained.

Then, the Pt—Pd mixed solution was impregnated onto 1,000 g of γ-alumina powder A of which the BET specific surface area was 125 $m^2/g$, the average pore diameter was 20 nm, the pore volume was 0.83 $cm^3/g$, the volume density was 0.42 g/cm³ and the diesel fuel combustibility activation energy was 69.2 kJ/mol (refer to FIGS. 3 to 6) so as to attain 0.407% by weight (Pt/Pd=3/1) in the precious metal equivalent, which was then calcined at 500° C. for one hour in the electric furnace and Pt—Pd-carried γ-alumina powder a was thus obtained.

Also, the Pt—Pd mixed solution was impregnated onto 1,000 g of θ-alumina powder B (containing 4% by weight $La_2O_3$) of which the BET specific surface area was 195 m²/g, the average pore diameter was 18 nm, the pore volume was 1.15 cm³/g, the volume density was 0.22 g/cm³ and the diesel fuel combustibility activation energy was 69.5 kJ/mol so as to attain 2.0% by weight (Pt/Pd=3/1) in the precious metal equivalent, which was then calcined at 500° C. for one hour in the electric furnace and Pt—Pd-carried θ-alumina powder b was thus obtained.

The Pt—Pd-carried γ-alumina powder a 920.75 g, the Pt—Pd-carried θ-alumina powder b 186.75 g and water were put in a ball mill and were ball-milled until a predetermined particle size was attained, so that the slurry α was obtained. The viscosity of the slurry was measured and indicated in Table 1.

Subsequently, an integral-type carrier, that is, a honeycomb flow-through-type cordierite carrier (300 cells/inch² (465 k/m²), thickness of 8 mil (0.2 mm), diameter of 143.8 mm × length of 76.2 mm, 1.238 L) was immersed into the slurry α, which was then coated by the wash-coat method so that a carrying amount of the Pt—Pd-carried alumina per unit volume was 110.75 g/L, and then dried at 150° C. for 1 hour and calcined at 500° C. for 2 hours under atmosphere to obtain a base layer of the diesel fuel combustibility oxidation catalyst (1).

=Upper Layer=

The Pt—Pd mixed solution was impregnated onto 1,000 g of γ-alumina powder A so as to attain 0.826% by weight (Pt/Pd=3/1) in the precious metal equivalent, which was then calcined at 500° C. for one hour in the electric furnace and Pt—Pd-carried γ-alumina powder c was thus obtained. Also, the Pt—Pd mixed solution was impregnated onto 1,000 g of θ-alumina powder B so as to attain 4.0% by weight (Pt/Pd=3/1) in the precious metal equivalent, which was then calcined at 500° C. for one hour in the electric furnace and Pt—Pd-carried θ-alumina powder d was thus obtained.

The Pt—Pd-carried γ-alumina powder c 756.25 g, the Pt—Pd-carried θ-alumina powder d 156.25 g and water were put in the ball mill and were ball-milled until a predetermined particle size was attained, so that the slurry β was obtained. The viscosity of the slurry was measured and indicated in Table 1.

Subsequently, the lower layer-applied product was immersed into the slurry β, which was then coated by the wash-coat method so that a catalyst carrying amount per unit volume was 91.25 g/L, and then dried at 150° C. for 1 hour and calcined at 500° C. for 2 hours under atmosphere to obtain the diesel fuel combustibility oxidation catalyst (1) (Pt=1.5 g/L, Pd=0.5 g/L, catalyst amount: 202 g/L, alumina A:alumina B=83.3:16.7).

The obtained diesel fuel combustibility oxidation catalyst (1) was calcined at 650° C. for 50 hours under air atmosphere in the electric furnace, which was then filled in the converter. The converter was connected to the exhaust opening of the diesel engine (displacement: 2 L), the diesel fuel was pulse-sprayed thereto, and the change of the exhaust gas temperature at the catalyst exit over time was measured and indicated in Table 1 and FIG. 7.

Example 2

<Preparation of Diesel Fuel Combustibility Oxidation Catalyst (2)>

The same method as Example 1 was performed to obtain the diesel fuel combustibility oxidation catalyst (2) (Pt=1.5 g/L, Pd=0.5 g/L, catalyst amount: 202 g/L, alumina A:alumina C=83.3:16.7), except that the θ-alumina powder B was replaced with θ-alumina powder C (containing 4% by weight $La_2O_3$) of which the BET specific surface area was 110 m²/g, the average pore diameter was 30 nm, the pore volume was 1.00 cm³/g, the volume density was 0.20 g/cm³ and the diesel fuel combustibility activation energy was 62.3 kJ/mol (refer to FIGS. 3 to 6). Also, the viscosities of the slurries for the lower layer and the upper layer were measured and indicated in Table 1.

The obtained diesel fuel combustibility oxidation catalyst (2) was calcined at 650° C. for 50 hours under air atmosphere in the electric furnace, which was then filled in the converter. The converter was connected to the exhaust opening of the 2 L diesel engine (displacement: 2 L), the diesel fuel was pulse-sprayed thereto, and the change of the exhaust gas temperature at the catalyst exit over time was measured and indicated in Table 1 and FIG. 7.

<Preparation of Diesel Fuel Combustibility Oxidation Catalyst (3)>

The same method as Example 2 was performed to obtain the diesel fuel combustibility oxidation catalyst (3) (Pt=1.5 g/L, Pd=0.5 g/L, catalyst amount: 202 g/L, alumina A:alumina C=83.3:16.7), except that the honeycomb flow-through-type cordierite carrier was replaced with a carrier (300 cells/inch² (465 k/m²), thickness of 8 mil (0.2 mm), diameter of 190.5 mm×length of 76.2 mm, 2.172 L).

The obtained diesel fuel combustibility oxidation catalyst (3) was calcined at 600° C. for 50 hours under air atmosphere in the electric furnace, which was then filled in the converter. The converter was connected to the exhaust opening of the 5 L diesel engine (displacement: 5 L), the diesel fuel was pulse-sprayed thereto, and the change of the exhaust gas temperature at the catalyst exit over time was measured and indicated in Table 2 and FIG. 8.

Example 3

<Preparation of Diesel Fuel Combustibility Oxidation Catalyst (4)>

The same method as Example 1 was performed to obtain the diesel fuel combustibility oxidation catalyst (4) (Pt=1.5 g/L, Pd=0.5 g/L, catalyst amount: 202 g/L, alumina A:alumina D=83.3:16.7), except that the θ-alumina powder B was replaced with γ-alumina powder D (containing 4% by weight $La_2O_3$) of which the BET specific surface area was 166 m²/g, the average pore diameter was 20 nm, the pore volume was 0.82 cm³/g, the volume density was 0.19 g/cm³ and the diesel fuel combustibility activation energy was 69.7 kJ/mol (refer to FIGS. 3 to 6). Also, the viscosities of the slurries for the lower layer and the upper layer were measured and indicated in Table 1.

The obtained diesel fuel combustibility oxidation catalyst (4) was calcined at 650° C. for 50 hours under air atmosphere in the electric furnace, which was then filled in the converter. The converter was connected to the exhaust opening of the 2 L diesel engine (displacement: 2 L), the diesel fuel was pulse-sprayed thereto, and the change of the exhaust gas temperature at the catalyst exit over time was measured and indicated in Table 1 and FIG. 7.

Example 4

<Preparation of Diesel Fuel Combustibility Oxidation Catalyst (5)>

The same method as Example 1 was performed to obtain the diesel fuel combustibility oxidation catalyst (5) (Pt=1.5 g/L, Pd=0.5 g/L, catalyst amount: 202 g/L, alumina A:alumina E=83.3:16.7), except that the θ-alumina powder B was replaced with θ-alumina powder E (containing 10% by weight $SiO_2$) of which the BET specific surface area was 114 $m^2/g$, the average pore diameter was 25 nm, the pore volume was 0.90 $cm^3/g$, the volume density was 0.23 $g/cm^3$ and the diesel fuel combustibility activation energy was 65.6 kJ/mol (refer to FIGS. 3 to 6) and the honeycomb flow-through-type cordierite carrier was replaced with a carrier (300 cells/$inch^2$ (465 k/$m^2$), thickness of 8 mil (0.2 mm), diameter of 190.5 mm×length of 76.2 mm, 2.172 L). Also, the viscosities of the slurries for the lower layer and the upper layer were measured and indicated in Table 2.

The obtained diesel fuel combustibility oxidation catalyst (5) was calcined at 600° C. for 50 hours under air atmosphere in the electric furnace, which was then filled in the converter. The converter was connected to the exhaust opening of the 5 L diesel engine (displacement: 5 L), the diesel fuel was pulse-sprayed thereto, and the change of the exhaust gas temperature at the catalyst exit over time was measured and indicated in Table 2 and FIG. 8.

Example 5

<Preparation of Diesel Fuel Combustibility Oxidation Catalyst (6)>

The Pt—Pd mixed solution was impregnated onto 1,000 g of γ-alumina powder A so as to attain 1.08% by weight (Pt/Pd=3/1) in the precious metal equivalent, which was then calcined at 500° C. for one hour in the electric furnace and Pt—Pd-carried γ-alumina powder e was thus obtained.

Also, the Pt—Pd mixed solution was impregnated onto 1,000 g of θ-alumina powder C (containing 4% by weight $La_2O_3$) so as to attain 5.18% by weight (Pt/Pd=3/1) in the precious metal equivalent, which was then calcined at 500° C. for one hour in the electric furnace and Pt—Pd-carried θ-alumina powder f was thus obtained.

The Pt—Pd-carried γ-alumina powder e 927 g, the Pt—Pd-carried θ-alumina powder f 193 g and water were put in the ball mill and were ball-milled until a predetermined particle size was attained, so that the slurry γ was obtained. The viscosity of the slurry was measured and indicated in Table 1.

Subsequently, an integral-type carrier, that is, a honeycomb flow-through-type cordierite carrier (400 cells/$inch^2$ (620 k/$m^2$), thickness of 6 mil (0.15 mm), diameter of 143.8 mm×length of 118 mm, 1.917 L) was immersed into the slurry γ, which was then coated by the wash-coat method so that a carrying amount of the Pt—Pd-carried alumina per unit volume was 112 g/L, and then dried at 150° C. for 1 hour and calcined at 500° C. for 2 hours under atmosphere to obtain the diesel fuel combustibility oxidation catalyst (6) (Pt=1.5 g/L, Pd=0.5 g/L, catalyst amount: 112 g/L, alumina A:alumina C=91.7:18.3).

The obtained diesel fuel combustibility oxidation catalyst (6) was calcined at 650° C. for 50 hours under air atmosphere in the electric furnace, which was then filled in the converter. The converter was connected to the exhaust opening of the 3 L diesel engine (displacement: 3 L), the diesel fuel was pulse-sprayed thereto, and the change of the exhaust gas temperature at the catalyst exit over time was measured and indicated in Table 3 and FIG. 9.

Comparative Example 1

<Preparation of Diesel Fuel Combustibility Oxidation Catalyst (7)>

The same method as Example 1 was performed to obtain the diesel fuel combustibility oxidation catalyst (7) (Pt=1.5 g/L, Pd=0.5 g/L, catalyst amount: 202 g/L, alumina A:alumina F=83.3:16.7), except that the θ-alumina powder B was replaced with γ-alumina powder F (containing 4% by weight $La_2O_3$) of which the BET specific surface area was 179 $m^2/g$, the average pore diameter was 15 nm, the pore volume was 0.91 $cm^3/g$, the volume density was 0.28 $g/cm^3$ and the diesel fuel combustibility activation energy was 73.3 kJ/mol (refer to FIGS. 3 to 6). Also, the viscosities of the slurries for the lower layer and the upper layer were measured and indicated in Table 1.

The obtained diesel fuel combustibility oxidation catalyst (7) was calcined at 650° C. for 50 hours under air atmosphere in the electric furnace, which was then filled in the converter. The converter was connected to the exhaust opening of the 2 L diesel engine (displacement: 2 L), the diesel fuel was pulse-sprayed thereto, and the change of the exhaust gas temperature at the catalyst exit over time was measured and indicated in Table 1 and FIG. 7.

Comparative Example 2

<Preparation of Diesel Fuel Combustibility Oxidation Catalyst (8)>

The same method as Example 1 was performed to obtain the diesel fuel combustibility oxidation catalyst (8) (Pt=1.5 g/L, Pd=0.5 g/L, catalyst amount: 202 g/L, alumina A:alumina G=83.3:16.7), except that the θ-alumina powder B was replaced with γ-alumina powder G of which the BET specific surface area was 136 $m^2/g$, the average pore diameter was 19 nm, the pore volume was 0.89 $cm^3/g$, the volume density was 0.21 $g/cm^3$ and the diesel fuel combustibility activation energy was 74.3 kJ/mol (refer to FIGS. 3 to 6). Also, the viscosities of the slurries for the lower layer and the upper layer were measured and indicated in Table 1.

The obtained diesel fuel combustibility oxidation catalyst (8) was calcined at 650° C. for 50 hours under air atmosphere in the electric furnace, which was then filled in the converter. The converter was connected to the exhaust opening of the 2 L diesel engine (displacement: 2 L), the diesel fuel was pulse-sprayed thereto, and the change of the exhaust gas temperature at the catalyst exit over time was measured and indicated in Table 1 and FIG. 7.

Comparative Example 3

<Preparation of Diesel Fuel Combustibility oxidation Catalyst (9)>

The same method as Example 5 was performed to obtain the diesel fuel combustibility oxidation catalyst (9) (Pt=1.5 g/L, Pd=0.5 g/L, catalyst amount: 112 g/L, alumina A:alumina G=91.7:18.3), except that the θ-alumina powder C was replaced with γ-alumina powder G. Also, the viscosity of the slurry was measured and indicated in Table 3.

The obtained diesel fuel combustibility oxidation catalyst (9) was calcined at 650° C. for 50 hours under air atmosphere in the electric furnace, which was then filled in the converter. The converter was connected to the exhaust opening of the 3 L diesel engine (displacement: 3 L), the diesel fuel was pulse-sprayed thereto, and the change of the exhaust gas temperature at the catalyst exit over time was measured and indicated in Table 3 and FIG. 9.

TABLE 1

|  | Used alumina/ Ea(kJ/mol) |  | Slurry viscosity (mPa · s) | ΔT(° C.) | |
|---|---|---|---|---|---|
|  |  |  |  | First diesel fuel spraying | Second diesel fuel spraying |
| Example 1 | A/69.2 | B/69.5 | Lower layer 1040 Upper layer 890 | 83.7 | 84.0 |
| Example 2 |  | C/62.3 | Lower layer 610 Upper layer 820 | 85.0 | 86.8 |
| Example 3 |  | D/69.7 | Lower layer 1400 Upper layer 1400 | 89.2 | 91.2 |
| Comparative Example 1 |  | F/73.3 | Lower layer 450 Upper layer 820 | 4.4 | 13.5 |
| Comparative Example 2 |  | G/74.3 | Lower layer 3600 Upper layer 2200 | 32.6 | 10.8 |

TABLE 2

|  | Used alumina/ Ea(kJ/mol) |  | Slurry viscosity (mPa · s) | ΔT(° C.) | |
|---|---|---|---|---|---|
|  |  |  |  | First diesel fuel spraying | Second diesel fuel spraying |
| Example 2 | A/69.2 | C/62.3 | Lower layer 610 Upper layer 820 | 13.7 | 11.8 |
| Example 4 |  | E/65.6 | Lower layer 1300 Upper layer 760 | 13.5 | 10.8 |

TABLE 3

|  | Used alumina/ Ea(kJ/mol) |  | Slurry viscosity (mPa · s) | ΔT(° C.) | |
|---|---|---|---|---|---|
|  |  |  |  | First diesel fuel spraying | Second diesel fuel spraying |
| Example 5 | A/69.2 | C/62.3 | 1250 | 310 | 265 |
| Comparative Example 3 |  | G/74.3 | 1900 | 271 | 194 |

Evaluation

Figure 3:
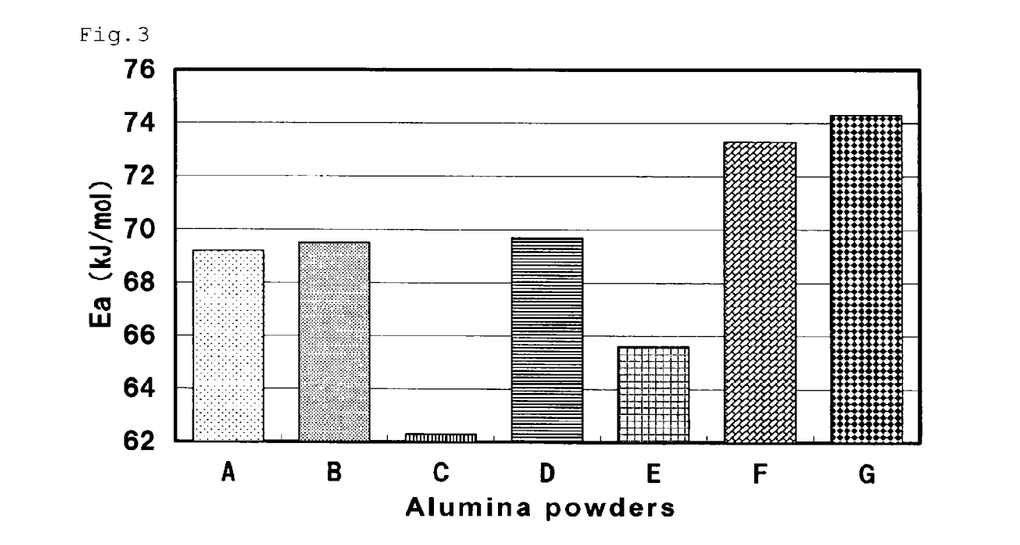
FIG. 3 is a graph showing the activation energy of the diesel fuel combustibility of the alumina powders A to G, which are the catalyst material.
Figure 7:
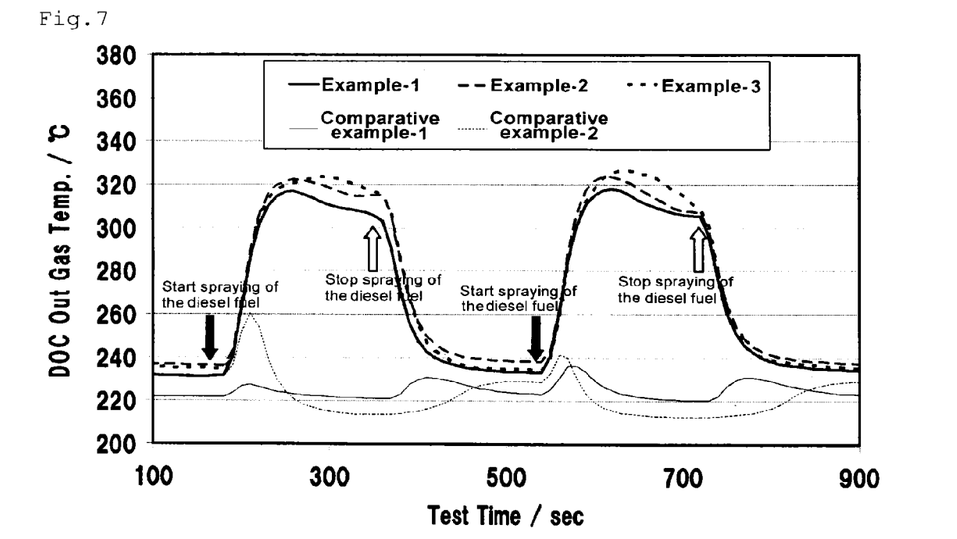
FIG. 7 is a graph showing changes of exhaust gas temperatures at a catalyst exit before and after the spraying of the diesel fuel in an exhaust gas purification device of a diesel engine (a displacement thereof is 2 L), in which the diesel fuel combustibility oxidation catalyst (DOC) is incorporated.

From FIG. 7 showing the evaluation test of the diesel fuel combustion performance at 220° C. by the 2 L diesel engine using Examples 1 to 3 and Comparative Examples 1, 2 (catalyst capacity: 1.238 L) after the heat treatment at 650° C. for 50 hours and Table 1 and FIG. 3 showing the activation energy of the diesel fuel combustion performance of the alumina powders A to G used as the inorganic matrix of the oxidation catalyst, the followings can be understood.

As can be clearly seen from FIG. 7, Table 1 and FIG. 3, Example 1 (alumina A (69.2 kJ/mol)+alumina B (69.5 kJ/mol)), Example 2 (alumina A (69.2 kJ/mol)+alumina C (62.3 kJ/mol)) and Example 3 (alumina A (69.2 kJ/mol)+alumina D (69.7 kJ/mol)), in which two types of alumina of which the activation energy is 72 kJ/mol or less were combined as the inorganic matrix, exhibited the more excellent diesel fuel combustion performance than the comparative example 1 (alumina A (69.2 kJ/mol, 83.3% by weight)+alumina F (73.3 kJ/mol, 16.7% by weight)) and the comparative example 2 (alumina A (69.2 kJ/mol, 83.3% by weight)+alumina G (74.3 kJ/mol, 16.7% by weight)), in which the alumina of which the activation energy of the diesel fuel combustion performance exceeds 72 kJ/mol was contained in an amount above 15% by weight, as the inorganic matrix.

Also, from the evaluation test (FIG. 8) of the diesel fuel combustion performance at 200° C. by the 5 L diesel engine using Examples 2 and 4 (both the catalyst capacity: 2.172 L) after the heat treatment at 600° C. for 50 hours and Table 2 and the properties (FIG. 3) of the alumina powders A to G used as the inorganic matrix of the oxidation catalyst, the followings can be understood.

Figure 8:
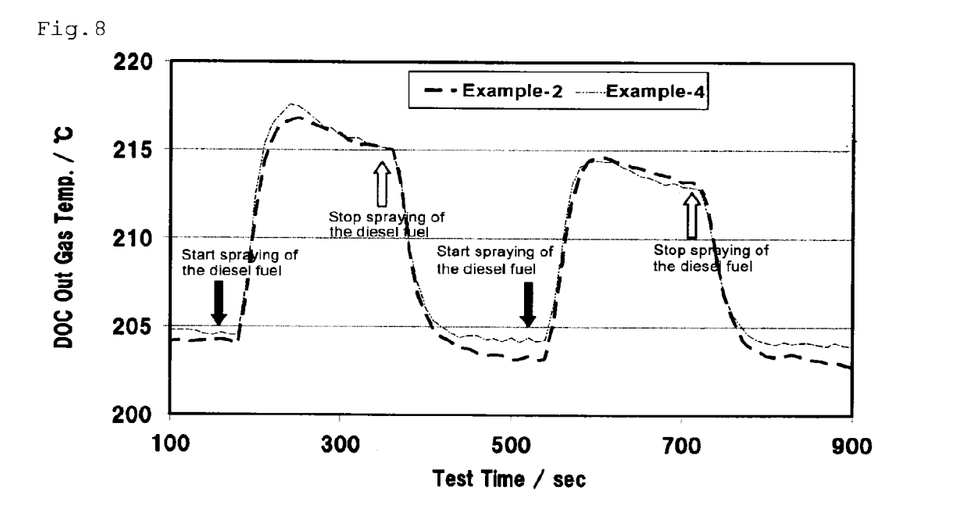
FIG. 8 is a graph showing changes of the exhaust gas temperatures at the catalyst exit before and after the spraying of the diesel fuel in an exhaust gas purification device of a diesel engine (a displacement thereof is 5 L), in which the diesel fuel combustibility oxidation catalyst (DOC) is incorporated.

As can be clearly seen from FIG. 8, Table 2 and FIG. 3, Example 4 (alumina A (69.2 kJ/mol)+alumina E (65.6 kJ/mol)), in which two types of alumina of which the activation energy of the diesel fuel combustion performance is 72 kJ/mol or less were combined as the inorganic matrix, exhibited the equivalent diesel fuel combustion performance to Example 2 (alumina A (69.2 kJ/mol)+alumina C (62.3 kJ/mol)) even at 200° C. further lowered by 20° C. from the exhaust gas temperature at the catalyst entry.

The above results were particularly conspicuous in the oxidation catalyst of two-layered coat. However, the same results were also seen more or less in the oxidation catalyst of one-layered coat.

For example, from the evaluation test (FIG. 9) of the diesel fuel combustion performance at 210° C. by the 3 L diesel engine using Example 5 and Comparative Example 3 (both the catalyst capacity: 1.917 L) after the heat treatment at 650° C. for 50 hours and Table 3 and FIG. 3, the remarkable operational effects of the present invention are clear. That is, Example 5 (alumina A (69.2 kJ/mol, 91.7% by weight)+alumina C (62.3 kJ/mol, 18.3% by weight)), in which the two types of alumina of which the activation energy of the diesel fuel combustion performance is 72 kJ/mol or less were combined as the inorganic matrix, exhibited the more excellent diesel fuel combustion performance than the comparative example 3 (alumina A (69.2 kJ/mol, 91.7% by weight)+alumina G (74.3 kJ/mol, 18.3% by weight)), in which the alumina of which the activation energy of the diesel fuel combustion performance exceeds 72 kJ/mol was contained in an amount above 15% by weight, as the inorganic matrix.

Figure 4:
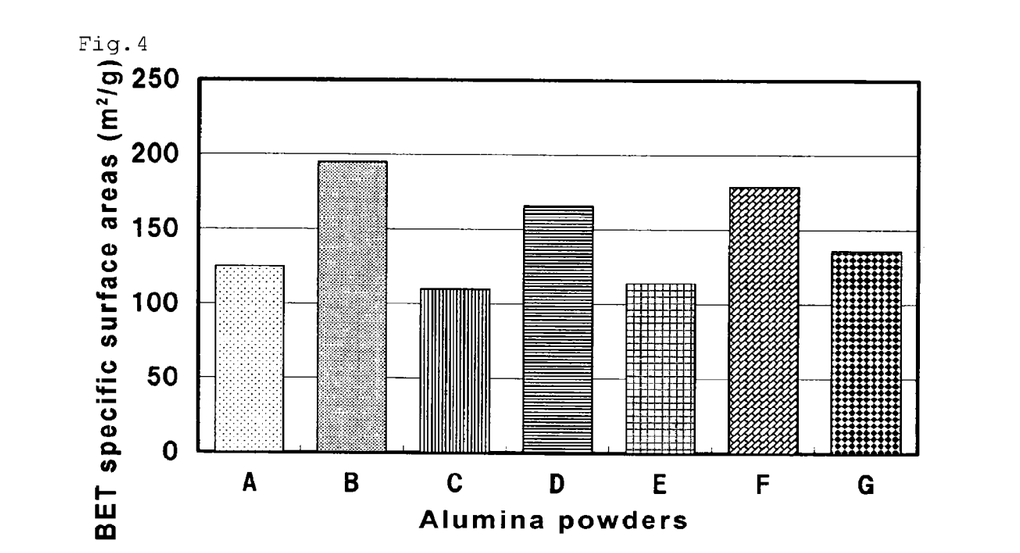
FIG. 4 is a graph showing BET specific surface areas of the alumina powders A to G, which are the catalyst material.
Figure 5:
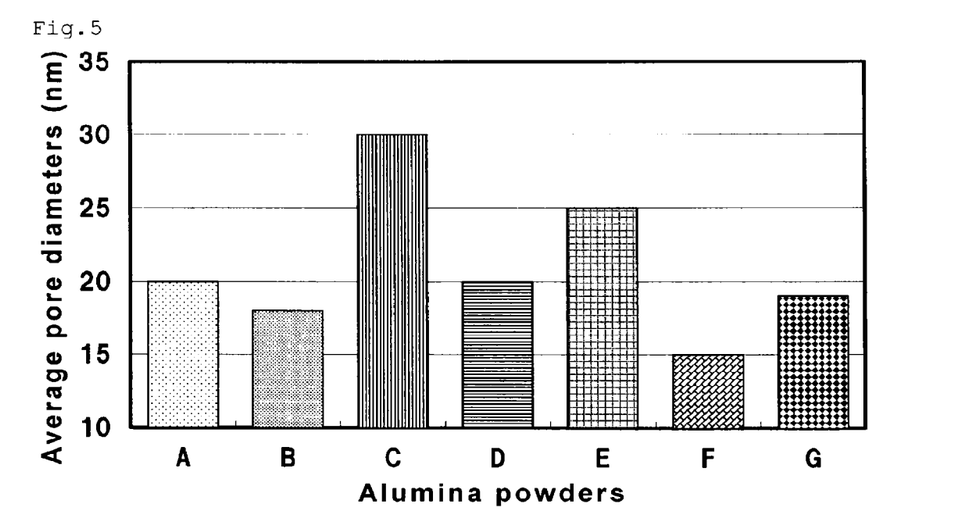
FIG. 5 is a graph showing average pore diameters of the alumina powders A to G, which are the catalyst material.
Figure 6:
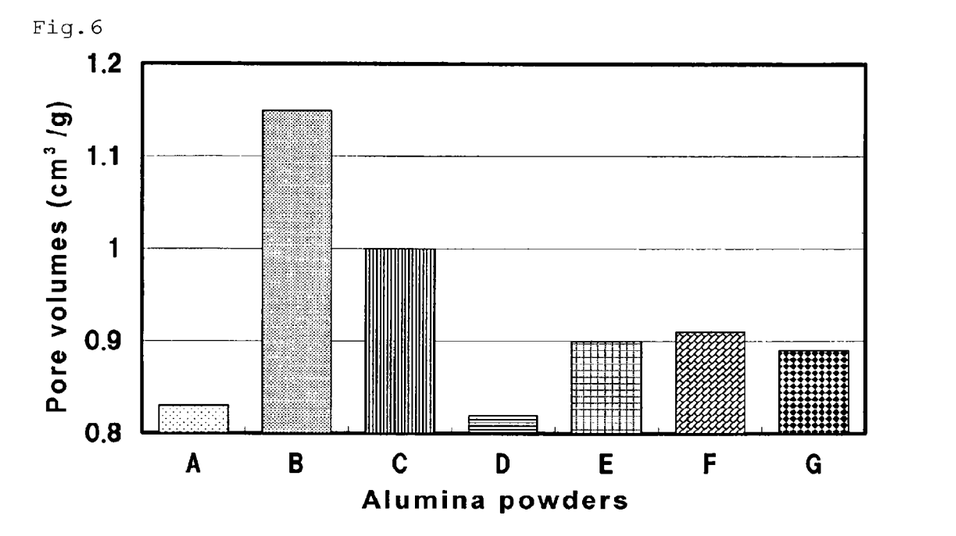
FIG. 6 is a graph showing pore volumes of the alumina powders A to G, which are the catalyst material.
Figure 9:
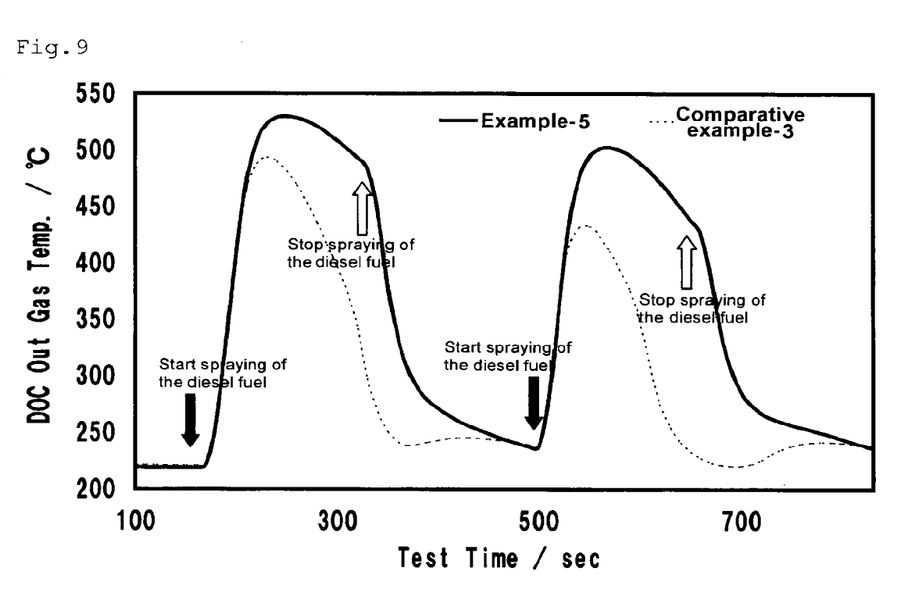
FIG. 9 is a graph showing changes of the exhaust gas temperatures at the catalyst exit before and after the spraying of the diesel fuel in an exhaust gas purification device of a diesel engine (a displacement thereof is 3 L), in which the diesel fuel combustibility oxidation catalyst (DOC) is incorporated.

In the meantime, from FIGS. 7 to 9 and Tables 1 to 3 showing the good or bad of the diesel fuel combustion performance and FIGS. 4 to 6 showing the properties (BET specific surface area, pore diameter and pore volume) of the alumina, the followings are clear. As for the alumina B to G except for the alumina A used in Examples 1 to 5 and Comparative Examples 1 to 3, when comparing the properties (BET specific surface area, pore diameter and pore volume), which are thought to be closely involved in the good or bad of the activity, and the good or bad of the diesel fuel combustion performance, it is not seen that there is a correlativity between the magnitude of any property and the good or bad of the diesel fuel combustion performance. That is, it can be said that it is important that the activation energy of the diesel fuel combustion performance of the inorganic matrix is 72 kJ/mol or less.

Also, as the alumina, θ-type (used for the alumina B, C and E) can be used, in addition to γ-type (used for the alumina A, D, F and G). Also, as for the additive, $La_2O_3$ (content rate: 4% by weight, used for the alumina B, C, D and F) represented by the rare earth, $SiO_2$ (content rate: 10% by weight, used for the alumina E) and the like can be used inasmuch as the amount thereof is 20% by weight or less.

However, to the extent that the results show, in order to maintain the crystalline structure of the alumina even though the diesel fuel is non-uniformly sprayed due to the abnormality of the sprayer, for example, and a part of the oxidation catalyst is exposed to the abnormal high temperatures, it is very useful to use the higher-temperature treated θ-alumina or δ-alumina than the γ-alumina and to add lanthanum, silica, zirconia and the like, which can improve the durability of the alumina, to the alumina.

Also, when making the slurry, it is preferably to add the alumina B to E of which the volume density is low, even though the alumina A of which the volume density is high is solely used to cause the viscosity abnormality that the viscosity cannot be measured. This is clearly seen from Tables 1 to 3. When the alumina of which the volume density is low is added, the slurry viscosity is improved to 600 to 1,400 mPa·s and the slurry appropriate to the application of the catalyst can be made.

From the above results, it can be understood that the good or bad of the diesel fuel combustion performance of the oxidation catalyst upon the diesel fuel spraying using an actual diesel engine depends on only the magnitude of the activation energy of the diesel fuel combustion performance of the alumina itself used as the inorganic matrix of the oxidation catalyst.

That is, even when the diesel fuel combustion performance is not evaluated by using a large capacity of the diesel engine and actually manufacturing a large capacity of the oxidation catalyst, the activation energy of the diesel fuel combustion performance of the inorganic matrix itself used for the oxidation catalyst has only to be measured. When the value is 72 kJ/mol or less, the corresponding inorganic oxide is used in an amount of 90% by weight or more, as the inorganic matrix, so that the high performance oxidation catalyst for diesel fuel combustion can be obtained.

Also, even though the slurry in which the alumina is solely used and the viscosity abnormality/precipitation abnormality is thus caused is made, when the two or more types of the alumina having different volume densities are used, the properties of the slurry are improved, so that the catalyst can be stably applied.

INDUSTRIAL APPLICABILITY

The oxidation catalyst and exhaust gas purification device of the present invention can be used for a diesel vehicle, a moving object such as a ship, a stationary device such as a power generator, and the like, and is particularly useful for the diesel vehicle.

The invention claimed is:

1. An oxidation catalyst comprising:
a precious metal component carried on
an inorganic matrix that comprises in an amount exceeding 85% by weight of one or more inorganic oxides having an activation energy of diesel fuel combustion performance of 72 kJ/mol or less selected from the group consisting of alumina, titania, zirconia, silica, and silica-alumina.

2. The oxidation catalyst according to claim 1, wherein the one or more inorganic oxide consists of two or more inorganic oxides having different volume densities.

3. The oxidation catalyst according to claim 1, wherein the precious metal component is platinum (Pt) and/or palladium (Pd).

4. The oxidation catalyst according to claim 1, wherein the one or more inorganic oxide comprises alumina, wherein the alumina consists of one or more alumina selected from the group consisting of γ-alumina, δ-alumina and θ-alumina.

5. The oxidation catalyst according to claim 1, wherein the inorganic matrix further comprises a rare earth oxide.

6. The oxidation catalyst according to claim 5, wherein the rare earth oxide is a lanthanum oxide.

7. The oxidation catalyst according to claim 5, wherein an amount of the rare earth oxide contained in the inorganic matrix is from 1 to 20% by weight.

8. The oxidation catalyst according to claim 1, wherein the one or more inorganic oxide comprises silica-alumina, wherein an amount of the silica contained in the silica-alumina is 1 to 20% by weight.

9. The oxidation catalyst according to claim 1, wherein the oxidation catalyst is coated on an integral structure-type carrier, as one or more catalyst layers.

10. The oxidation catalyst according to claim 9, wherein a coating amount of the catalyst layer is 50 to 300 g/L.

11. The oxidation catalyst according to claim 9, wherein a total amount of the precious metal to be carried is 0.5 to 4.0 g/L in metal equivalent.

12. The oxidation catalyst according to claim 1, wherein the one or more inorganic oxides have an activation energy of diesel fuel combustion performance of 71 kJ/mol or less.

13. The oxidation catalyst according to claim 1, wherein the one or more inorganic oxides have an activation energy of diesel fuel combustion performance of 70 kJ/mol or less.

14. The oxidation catalyst according to claim 1, wherein the inorganic matrix comprises the one or more inorganic oxides in an amount of 90% by weight or more.

15. The oxidation catalyst according to claim 1, wherein the inorganic oxide has a BET specific surface area of 50 to 195 $m^2/g$.

* * * * *